Oct. 28, 1941.  W. N. VANATTA  2,260,647
SOLDERING IRON
Filed Oct. 14, 1938
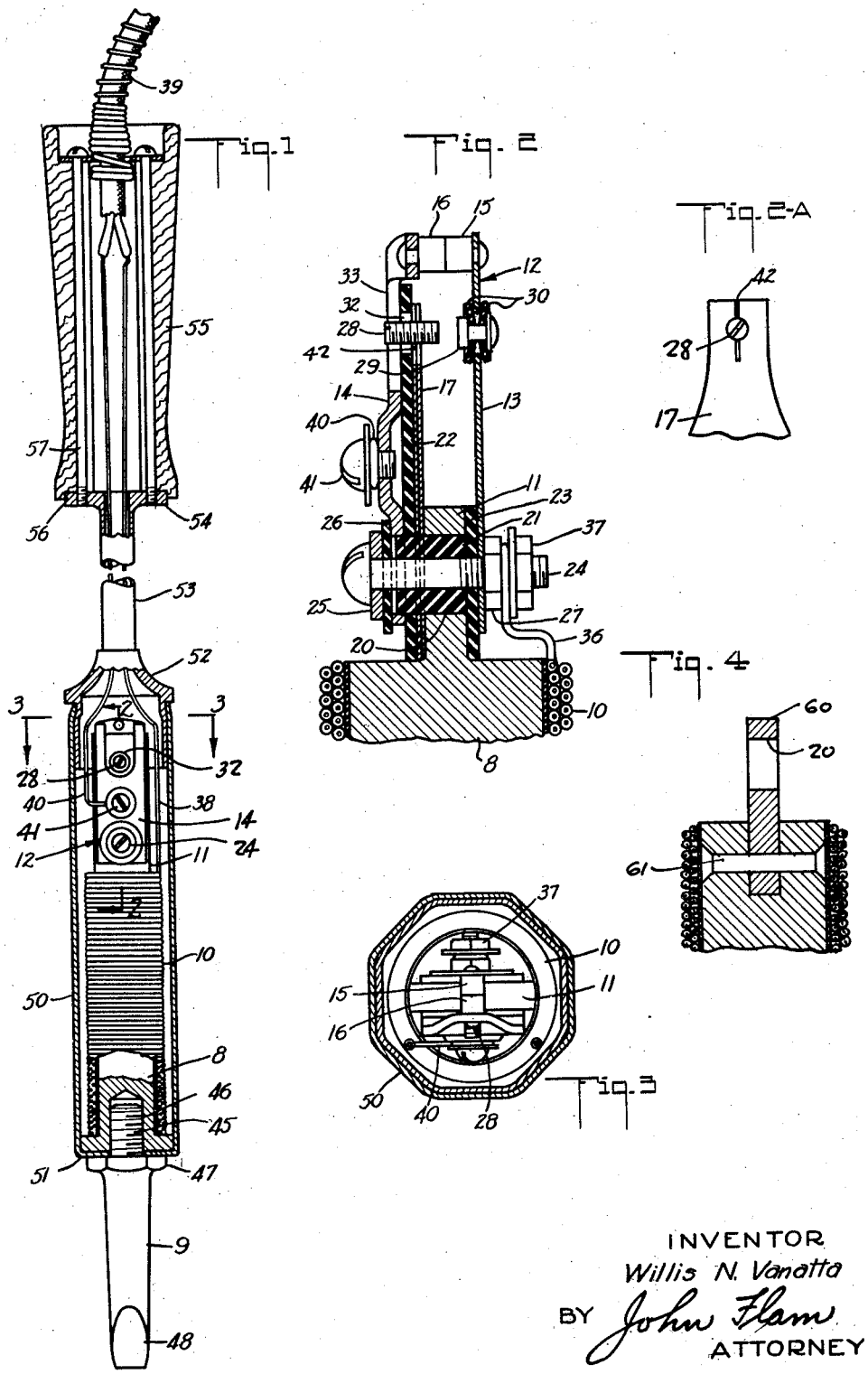
INVENTOR
Willis N. Vanatta
BY John Flam
ATTORNEY Patented Oct. 28, 1941

2,260,647

UNITED STATES PATENT OFFICE 2,260,647

SOLDERING IRON

Willis N. Vanatta, Ontario, Calif.

Application October 14, 1938, Serial No. 234,985

8 Claims. (Cl. 200—138)

This invention relates to a temperature controlled electrically heated soldering iron, although the thermostat per se is not necessarily limited to such use. This application is a continuation in part of an earlier application filed in the name of Willis N. Vanatta, April 26, 1937, Serial Number 138,988, entitled "Electrically heated soldering iron."

It is common practice to make such soldering irons with only a manual control, equipping them, however, with a relatively small capacity heating element to reduce the liability of injury when the current is inadvertently left on for a long period. The use of such a small heating element, however, causes the iron to be slow in reaching a sufficiently high temperature to be useful, as well as causing it to work unsatisfactorily on large pieces of work, especially when exposed to cooling air currents. The use of the small element also fails to accomplish its primary object, for even if the current is left on for a comparatively short period, the iron becomes too hot for use, and an excessive amount of scale forms on the tip. The use of a large heating element with a thermostat to control it in accordance with the temperature of the core is an obvious remedy. However, unless the thermostat is carefully placed so as to be immediately responsive to temperature changes in the core of the tool, the same defects will still be present.

It is accordingly one of the objects of this invention to provide a soldering iron or similar tool in which the temperature is held within narrow limits, in spite of the fact that the heating is of such intensity as to bring the tool up to operating temperature quickly.

It is still another object of this invention to provide a soldering iron, or the like, in which the thermostat is symmetrically mounted directly on the core and adjacent the heating coil so that it is immediately responsive to changes of temperature in the core.

It is still another object of this invention to provide a thermostatic switch in which the temperature responsive element carries no current but serves to operate a switch.

It is still another object of the invention to provide a soldering iron or the like, wherein the temperature responsive element of the thermostatic switch is attached directly to the core, without any intervening insulation.

It is still another object of this invention to provide a soldering iron having a novel form of tip permitting rapid transfer of heat from the core to the point.

This invention possesses many other advantages, and has other objects which may be made more easily apparent from a consideration of one embodiment of the invention. For this purpose there is shown a form in the drawing accompanying and forming part of the present specification. This form will now be described in detail, illustrating the general principles of the invention; but it is to be understood that this detailed description is not to be taken in a limiting sense, since the scope of this invention is best defined by the appended claims.

In the drawing:

Figure 1 is an elevation, partly in section, of a medium or large sized soldering iron incorporating the invention;

Fig. 2 is a vertical transverse section on an enlarged scale, as seen on plane 2—2 of Fig. 1;

Fig. 2—a is a fragmentary elevation of one of the switch elements;

Fig. 3 is a cross section on an enlarged scale as seen on plane 3—3 of Fig. 1; and Fig. 4 is a fragmentary section of a modified form of core.

Referring to the drawing, the soldering iron includes the core 8 having a detachable tip 9 and the heating coil 10, the latter formed in a manner well understood of wire, with heat resistant insulation.

To achieve rapid heating of the core, the coil is of relatively high wattage; for instance, where a thirty watt coil would be used on a soldering iron without the thermostatic switch, in the present instance a coil of several times this wattage would be used.

The core 8 has a tongue or extension 11 secured to it as by being formed integral therewith. The thermostatic switch 12 is mounted on tongue 11.

Switch 12 includes contact carrying arms 13 and 14, one of which, as 13, is resilient, the other arm 14, being rigid. These arms carry contact buttons 15 and 16 respectively which are urged into engagement by the resiliency of arm 13. A temperature responsive member 17, as for example a bimetallic member, is provided, which flexes more or less in response to temperature changes. It is disposed adjacent one of the arms, as 14. The arrangement is such that when member 17 flexes in response to a rise in temperature it operates the resilient arm 13 and causes contacts 15 and 16 to separate. The means by which it operates the arm 13 includes an adjustable abutment 28 whereby the amount of flexing and accordingly the temperature rise necessary to open the contacts may be altered. Appropriate insulation is provided whereby the element 17 is insulated at all times from the heating current; thus it may be placed directly in contact with tongue 11 without the necessity of intervening insulation, whereby it is in intimate heat exchange relation with the core.

A novel manner of mounting the switch is provided, whereby a single screw serves to hold the parts of the switch in assembled relationship as well as to mount them on the tongue. Referring to Fig. 2, it will be seen that tongue 11 is provided with a single aperture 20 carrying an insulating bushing 21 which extends to the left of the tongue 11 and supports the bimetallic element 17, a layer of insulating material 22 and contact arm 14. The arm 17 is directly in contact with tongue 11. The contact carrying arm 13 is mounted to the right of tongue 11, a layer of insulation 23 being interposed between them, on a screw 24 passing through bushing 21. The head of screw 24 engages arm 14 by means of washers 25 and 26, the latter serving to insulate them, while a nut 27 engages arm 13 and serves to clamp the parts described, together about tongue 11.

The upper end of arm 17 has a threaded hole through which extends the screw 28 forming an abutment arranged to engage a suitable pad 29 on arm 13. This pad may conveniently consist of a small rivet passing through the arm and insulated from it by insulating washers 30.

As shown in Fig. 2, insulation 22 is substantially coextensive with the bimetallic element 17 so as to effectively prevent it from coming in contact with arm 14. An aperture 32 is provided near the upper end of insulating layer 22 to accommodate the abutment 28. Arm 14 also has an aperture or cut out space 33 for the abutment.

One terminal as 36 of coil 10 is connected to contact arm 13, as by being clamped against nut 27 on screw 24 by another nut 37. The other terminal 38 of the coil leads out through the handle structure and is connected to one conductor of the usual supply cord 39. The other conductor of the supply cord is connected by lead 40 to contact arm 14, as by screw 41.

Thus the circuit may extend through lead 38, coil 10, lead 36, screw 24, arm 13, contact 15, contact 16, arm 14 and lead 40. Bimetallic arm 17 is so placed on the core that a rise in temperature will cause it to curve to the right. As this curvature increases, screw 28 engages pad 29, after which further curving will flex arm 13 and separate contacts 15, 16. This stops the flow of current to the heating coil. As the core cools, arm 17 becomes straighter, allowing the contacts to engage and energize coil 10.

By adjusting screw 28, the amount of flexure of arm 17 required to separate the contacts may be altered. In this way the temperature of the tool may be controlled. By referring to Fig. 2—a it will be noted that the upper end of arm 17 is of reduced width and is provided with a slot 42 which extends from below screw 28 to the top of the arm. The sides of the slot are compressed or forced together, as by striking the edge of the arm adjacent the slot with a hammer. This imparts a certain resilience to the arm where it engages the screw, in a well understood manner which serves to retain the screw in adjusted position.

The tip 9 is detachably secured in place by a threaded extension 45 which engages a correspondingly threaded opening 46 in the core 8. It is the invention to have tips of different sizes and configurations to suit the character of the work. It has a flat sided flange 47 adjacent the threaded portion to facilitate its renewal or replacement in the core. An important feature of the tip is its tapered form. Thus the large diameter near the core permits the heat to flow to the point at a rapid rate, while the small size of the end 48 of the tip permits use in a confined space, and without restricting the flow of heat.

Coil 10 and switch 12 are enclosed in a metal tube or sheath 50 having an inturned lip 51 at its lower edge which is clamped between the flange 47 on the tip and the end of core 8. The upper end of sheath 50 is secured to a member 52 which in turn is secured to a small diameter tube 53 carrying a flange 54 at its upper end. A handle 55 of nonconducting material as wood has a counterbore 56 at its lower end to receive flange 54. The handle is secured to the flange by a pair of long screws 57 extending axially through the handle. This arrangement keeps the rate of heat transfer to the handle low and assures a cool handle at all times.

Fig. 4 illustrates a modified form of core wherein the extension 60 is formed of a separate piece, secured to the core in any suitable way, as by rivet 61. The extension must be of material having good heat conductivity. Both the extension and the rivet should be of material having the same coefficient of expansion as the material of the core, to avoid looseness under different temperatures. The thermostatic switch is attached by means of a single aperture 20, as before.

What is claimed is:

1. In an electrically heated soldering iron including a core having an electric heater, said core having an extension adjacent the heater, a thermostatic switch comprising a pair of members supported in spaced relationship on said extension, each carrying a contact, one of said members being resilient so as to normally maintain the contacts in engagement, a bimetallic member disposed in intimate heat exchange relationship with the extension and arranged to flex in response to temperature changes therein, said bimetallic member when unflexed being out of operating relation with said flexible member, said bimetallic member being arranged to flex the resilient member, upon flexing, to operate the contacts.

2. In an electrically heated soldering iron including a core having an electric heater, said core having an extension adjacent the heater, a thermostatic switch comprising a pair of members supported in spaced relationship on said extension, each carrying a contact, one of said members being resilient so as to normally maintain the contacts in engagement, a bimetallic member disposed in intimate heat exchange relationship with the extension and arranged to flex in response to temperature changes therein, said bimetallic member when unflexed being out of operating relation with said flexible member, said bimetallic member being arranged to flex the resilient member, after flexing a predetermined amount, to operate the contacts.

3. In an electrically heated soldering iron including a core having an electric heater, said core having an extension adjacent the heater, a thermostatic switch comprising a pair of members supported in spaced relationship on said extension, each carrying a contact, one of said members being resilient so as to normally maintain the contacts in engagement, a bimetallic member disposed in intimate heat exchange relationship with the extension and arranged to flex in response to temperature changes therein, said bimetallic member when unflexed being out of operating relation with said flexible member, said bimetallic member carrying an adjustable abutment arranged to engage the resilient member after flexing a predetermined amount, so that further flexing will operate the contacts.

4. In an electrically heated soldering iron including a core having an elecric heater, said core having an integral extension adjacent the heater, a thermostatic switch comprising a pair of members mounted on opposite sides of the extension, one of said members being resilient, a bimetallic member disposed between one member of said pair and said extension so as to be in intimate heat exchange relation with said extension, said bimetallic member when unflexed being out of operating relation with said flexible member, said bimetallic member being arranged to flex in response to temperature changes and to engage the resilient member upon flexing.

5. In an electrically heated soldering iron including a core having an electric heater, an extension having good thermal conductivity secured to the core adjacent the heater and in intimate heat exchange relationship with the core, a thermostatic switch comprising: a rigid member and a resilient member respectively carrying contacts which are normally engaged, mounted on opposite sides of the extension, a bimetallic actuating member disposed between the rigid member and the extension so as to be in intimate heat exchange relation with the latter, said bimetallic member when unflexed being out of operating relation with said flexible member, an adjustable abutment carried by the actuating member adapted to engage said resilient member and operate the contacts upon flexing of the actuating member.

6. An electrically heated soldering iron including a core having a heating coil, said core having an extension adjacent the coil, there being an opening through the extension, a thermal control switch for the coil having a pair of contact members as well as a movable actuating member, said actuating member being out of operating relation with the contact members until the actuating member moves a predetermined amount, means extending through the opening serving to secure the members in assembled relationship, with the actuating member in intimate heat exchange relationship with the extension, said contact members respectively carrying contacts which are normally engaged, said actuating member being adapted to operate the contacts upon the core reaching a predetermined temperature.

7. An electrically heated soldering iron including a core having a heating coil, said core having an extension adjacent the coil, a thermal control switch mounted on the extension and having a pair of contact members and an actuating member, the actuating member being directly in contact with the extension so as to be in intimate thermal relation therewith, the contact members being insulated from the extension as well as from the actuating member, the contact members respectively carrying contacts which are normally engaged, but are adapted to be disengaged by the flexing of the actuating member under the influence of heat, said actuating member being out of operating relation with the contact members until the actuating member moves a predetermined amount.

8. In an electrically heated soldering iron including a core having an electric heater, said core having an extension adjacent the heater, a thermostatic switch comprising a pair of members supported in spaced relationship on the extension, each carrying a contact, one of the members being resilient and the other rigid so as to normally maintain the contacts in engagement, a bimetallic member disposed in intimate heat exchange relationship with the extension adjacent the rigid member and arranged to flex in response to temperature changes in the extension, said bimetallic member carrying an adjustable abutment arranged to engage the resilient member only after flexing a predetermined amount, so that further flexing will operate the contacts, there being an opening in the rigid member to permit adjustment of the abutment.

WILLIS N. VANATTA.